(12) United States Patent
Rupflin et al.

(10) Patent No.: US 11,279,190 B2
(45) Date of Patent: Mar. 22, 2022

(54) AXLE STRUT AND METHOD FOR PRODUCING AN AXLE STRUT

(71) Applicant: ZF FRIEDRICHSHAFEN AG, Friedrichshafen (DE)

(72) Inventors: Thomas Rupflin, Stetten (DE); Thomas Schwarz, Sigmarszell (DE); Andre Stieglitz, Osnabruck (DE); Philipp Bauer, Eriskirch (DE); Ingolf Müller, Minfeld (DE); Manfred Bürgmann, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 103 days.

(21) Appl. No.: 16/608,674

(22) PCT Filed: Mar. 27, 2018

(86) PCT No.: PCT/EP2018/057694
§ 371 (c)(1),
(2) Date: Oct. 25, 2019

(87) PCT Pub. No.: WO2018/197136
PCT Pub. Date: Nov. 1, 2015

(65) Prior Publication Data
US 2020/0139776 A1 May 7, 2020

(30) Foreign Application Priority Data

Apr. 28, 2017 (DE) .................. 10 2017 207 164.8

(51) Int. Cl.
*B60G 7/00* (2006.01)
*B29C 65/00* (2006.01)
(Continued)

(52) U.S. Cl.
CPC .......... *B60G 7/001* (2013.01); *B29C 66/7212* (2013.01); *B29C 65/483* (2013.01);
(Continued)

(58) Field of Classification Search
CPC ................ B60G 7/001; B60G 2206/11; B60G 2206/7101; B60G 2206/821;
(Continued)

(56) References Cited

U.S. PATENT DOCUMENTS 4,256,412 A * 3/1981 Tybus ..................... B64C 13/30
403/267
5,253,947 A * 10/1993 Petrzelka ................ B29C 65/64
403/274
(Continued)

FOREIGN PATENT DOCUMENTS

DE 102009009392 8/2010
DE 102012017940 3/2014
(Continued)

*Primary Examiner* — Darlene P Condra
(74) *Attorney, Agent, or Firm* — Cozen O'Connor (57) ABSTRACT

An axle strut for a vehicle having a shaft and two bearing regions. The axle strut has a supporting profile and two load-introducing elements. The supporting profile is formed from fiber reinforced plastics composite material. A first load-introducing element and a second load-introducing element are arranged at respective bearing region, and the supporting profile is arranged spatially between the two bearing regions. The supporting profile has a first connection area facing the first bearing region and a second connection area facing the second bearing region. Every load-introducing element has a receptacle. The supporting profile is connected by its first connection area and by the receptacle of the first load-introducing element to the first load-introducing element by an adhesive connection, and the supporting profile is connected by its second connection area and by (Continued)

the receptacle of the second load-introducing element to the second load-introducing element by a further adhesive connection.

16 Claims, 6 Drawing Sheets

(51) Int. Cl.
    *B29C 65/48*         (2006.01)
    *F16B 11/00*         (2006.01)

(52) U.S. Cl.
    CPC ...... *B29C 66/7422* (2013.01); *B60G 2206/11* (2013.01); *B60G 2206/7101* (2013.01); *B60G 2206/821* (2013.01); *F16B 11/006* (2013.01)

(58) Field of Classification Search
    CPC .............. B29C 66/7212; B29C 65/483; B29C 66/7422; B29C 66/12441; B29C 66/1248; B29C 66/524; B29C 66/534; F16B 11/006; B29L 2031/06
    See application file for complete search history.

(56) References Cited

U.S. PATENT DOCUMENTS

| | | | | |
|---|---|---|---|---|
| 7,427,237 | B2 * | 9/2008 | Burkett | F16C 3/026 464/181 |
| 8,025,301 | B2 * | 9/2011 | Guttilla | B23P 15/00 280/124.134 |
| 8,205,315 | B2 * | 6/2012 | Mullen | F16C 7/026 29/447 |
| 8,365,502 | B2 * | 2/2013 | Allen | B29C 66/721 52/843 |
| 8,414,003 | B2 * | 4/2013 | Yu | B60G 7/001 280/124.134 |
| 2003/0160414 | A1 * | 8/2003 | Pincerato | B60G 7/001 280/93.51 |
| 2010/0209185 | A1 * | 8/2010 | Kirth | B29C 37/0082 403/292 |
| 2012/0299263 | A1 * | 11/2012 | Mielke | B60G 7/001 280/124.134 |
| 2013/0328283 | A1 * | 12/2013 | Korte | B21D 53/90 280/124.134 |
| 2014/0035249 | A1 * | 2/2014 | Teijeiro Castro | B60G 21/0551 280/124.106 |
| 2014/0112708 | A1 * | 4/2014 | Carrere | B32B 1/08 403/265 |
| 2015/0259511 | A1 * | 9/2015 | Nakano | C08K 7/14 524/494 |
| 2016/0068034 | A1 * | 3/2016 | Smith | B60G 7/001 280/124.107 |
| 2016/0167471 | A1 * | 6/2016 | Hudler | B60G 7/001 280/124.125 |
| 2017/0001489 | A1 * | 1/2017 | Mosteiro Goyoaga | B23P 15/00 |
| 2018/0313391 | A1 * | 11/2018 | Diehl | B29C 66/322 |
| 2018/0354328 | A1 * | 12/2018 | Tatsumi | B60G 7/001 |
| 2019/0160513 | A1 * | 5/2019 | Koch | B32B 7/12 |

FOREIGN PATENT DOCUMENTS

| | | |
|---|---|---|
| DE | 102012218686 | 4/2014 |
| DE | 102013225911 | 6/2015 |
| DE | 102015215077 | 2/2017 |
| DE | 102015216966 | 3/2017 |
| EP | 2722533 | 4/2014 |
| EP | 3235667 | 10/2017 |
| JP | S61287807 | 12/1986 |
| JP | H10272707 | 10/1998 |
| JP | 2000337416 | 12/2000 |

* cited by examiner

AXLE STRUT AND METHOD FOR PRODUCING AN AXLE STRUT

CROSS REFERENCE TO RELATED APPLICATIONS

This is a U.S. national stage of Application No. PCT/EP2018/057694 filed Mar. 27, 2018. Priority is claimed on German Application No. DE 10 2017 207 164.8 filed Apr. 28, 2017 the content of which is incorporated herein by reference.

BACKGROUND OF THE INVENTION

1. Field of the Invention

The present invention is directed to an axle strut and to a method for producing an axle strut.

2. Description of the Prior Art

Axle struts for chassis of vehicles, for example, commercial vehicles, trucks or passenger vehicles, are predominantly axially loaded by compressive forces and tensile forces. In case of rolling loads, the axle strut is acted upon to a slight extent by torsion.

An axle strut comprising a shaft and two bearing regions is known from DE 102015215077 A1. The axle strut has a supporting winding, a core profile, and two load-introducing elements. The supporting winding and the core profile are formed from fiber reinforced plastics composite material.

SUMMARY OF THE INVENTION

One aspect of the present invention is an improved axle strut that has a low component mass and is inexpensive to produce. Further, the axle strut is to have an excellent loading behavior; among other things, stresses within the axle strut can be absorbed in an improved matter. The axle strut is to have high lateral stiffness. Further, the suggested axle strut is to be capable of modularization.

An axle strut for a vehicle comprises a shaft and two bearing regions. The axle strut has a supporting profile and two load-introducing elements. The supporting profile is formed from fiber reinforced plastics composite material. A first load-introducing element is arranged at a first bearing region of the two bearing regions, a second load-introducing element is arranged at a second bearing region of the two bearing regions, and the supporting profile is arranged at the shaft spatially between the two bearing regions. The supporting profile has a first connection area that faces the first bearing region and a second connection area that faces the second bearing region. Every load-introducing element has a receptacle, the supporting profile is connected by its first connection area and by the receptacle of the first load-introducing element to the first load-introducing element by an adhesive connection, and the supporting profile is connected by its second connection area and by the receptacle of the second load-introducing element to the second load-introducing element by a further adhesive connection.

The axle strut has a shaft and two bearing regions. The shaft is arranged between the two bearing regions and is connected to these bearing regions. The axle strut accordingly extends from the first bearing region along the shaft to the second bearing region. The first bearing region delimits the axle strut toward a first side, and the second bearing region delimits the axle strut toward a second side. In this regard, the length of the shaft can be greater than the width of the shaft; for example, the shaft can have a smaller width than the two bearing regions at their widest point. The exact shaping of the shaft depends on the available installation space. The bearing regions can be formed cylindrically with respect to their base surface, for example.

The axle strut can be used in a chassis of a vehicle, e.g., in a commercial vehicle, truck or passenger vehicle. Compressive forces and tensile forces act on the axle strut in driving operation and axially load the axle strut. As used herein, "axial" means in longitudinal direction of the axle strut, this longitudinal direction being determined by the two bearing regions. In other words, the longitudinal direction of the axle strut, and therefore a longitudinal axis of the axle strut, is defined from the first bearing region to the second bearing region along the shaft. Further, the axle strut is acted upon by torsion when a rolling load occurs at the chassis in which the axle strut is used. For example, if a vehicle jack is applied to the axle strut, a so-called misuse load event occurs, i.e., bending stresses on the axle strut.

The axle strut has a supporting profile. This supporting profile is formed from FRP. The supporting profile may be formed from a carbon fiber reinforced plastics composite (CRP). Alternatively, the supporting profile may be formed from a glass fiber reinforced plastics composite (GRP) or an aramid reinforced plastics composite (ARP) or other suitable FRP. Again alternatively, the supporting profile can be formed from a material combination of different FRPs. For example, a partial area of the supporting profile can be formed from CRP and another partial area of the supporting profile can be formed from GRP. The supporting profile is reinforced with continuous fiber. Alternatively, the supporting profile can be formed from a metal material. The axle strut is a geometrical extruded element which has a geometric outer lateral surface and two geometric top surfaces.

The axle strut has a load-introducing element at each of its bearing regions. Every load-introducing element has a cutout for a bearing. Every cutout of the load-introducing elements is suitable for receiving a bearing, e.g., a rubber-metal bearing, a bolt joint or an elastomeric bearing. An operative connection is produced between the load-introducing elements and the bearing by these cutouts. The load-introducing elements are configured based on a load input via the respective cutout. For example, every load-introducing element can have one or more longitudinal grooves or one or more transverse grooves in the area adjacent to the supporting profile. Further, every load-introducing element can have an area that is free of material, the shaping of the material-free area being oriented to the stress profile in the respective load-introducing element.

Every load-introducing element has a receptacle that is adapted in such a way that the load-introducing element can be connected to the respective connection area of the supporting profile. The two load-introducing elements preferably have identically shaped receptacles, but can also have receptacles that are shaped differently. The receptacle of each load-introducing element is arranged at the end of the load-introducing element that faces the supporting profile, i.e., opposite the cutout for the bearing.

The receptacle can be formed, for example, as two longitudinal grooves, which are formed inside of the respective load-introducing element. The longitudinal grooves are formed in such a way that they can receive the respective connection area of the supporting profile. Alternatively, the receptacle can be formed as three longitudinal grooves and one transverse groove, which are formed inside of the respective load-introducing element. The grooves are formed in such a way that they can receive the respective connection area of the supporting profile. Alternatively, the receptacle can be formed as a clearance inside of the respective load-introducing element, which clearance is formed in such a way that it can receive the respective connection area of the supporting profile. Again alternatively, the receptacle can be formed as a longitudinal groove, which is formed inside of the respective load-introducing element and which is formed in such a way that it can receive the respective connection area of the supporting profile. Again alternatively, the receptacle can be formed as a joint area of the outer lateral surface of the respective load-introducing element, which joint area is formed in such a way that it can be joined to the respective connection area of the supporting profile.

The supporting profile is arranged spatially between the two load-introducing elements. Accordingly, the shaft of the axle strut has the supporting profile. The supporting profile has the first connection area that faces the first bearing region and the second connection area that faces the second bearing region. The first connection area delimits the supporting profile toward a first side, and the second connection area delimits the supporting profile toward a second side. Accordingly, the supporting profile extends along the longitudinal axis of the axle strut from the first connection area to the second connection area. Every connection area serves to connect the supporting profile to the two load-introducing elements. The supporting profile has a unidirectional fiber reinforcement in longitudinal direction of the axle strut at least in a partial area, preferably in the connection areas. The supporting profile can also have, in its entirety, a unidirectional fiber reinforcement in longitudinal direction of the axle strut.

The supporting profile may be formed in one piece or of a plurality of parts. When formed in one piece, the supporting profile is produced in one piece, i.e., is not assembled from different component members. For example, the supporting profile can be produced by a pultrusion process or by a pulwinding process. The one-piece supporting profile cannot be disassembled in a nondestructive manner. When formed of multiple parts, the supporting profile can be assembled from a plurality of components, which may be glued together, for example, so that is not possible to disassemble the individual components in a nondestructive manner. In this way, the supporting profile can be produced in an economical manner. The supporting profile can be manufactured in a continuous manner so that it can be implemented to be modularizable. In other words, with continuous fabrication, the supporting profile can be tailored to a length of the shaft required for a specific vehicle type.

The first connection area of the supporting profile is glued to the receptacle of the first load-introducing element. Accordingly, there is an adhesive connection between the first load-introducing element and the supporting profile. The second connection area of the supporting profile is glued to the receptacle of the second load-introducing element. Accordingly, there is an adhesive connection between the second load-introducing element and the supporting profile. The first load-introducing element and the second load-introducing element are connected to the supporting profile in this way. The adhesive is preferably in liquid form and is elastic. The supporting profile is glued to the first load-introducing element and to the second load-introducing element two-dimensionally. That is, the adhesive contacts the respective receptacle as well as the respective load-introducing element in a planar manner. This two-dimensional bonding can have the same adhesive layer thickness at every location of the adhesive connection for spatial spreading of the adhesive; alternatively, the two-dimensional bonding can have a different adhesive layer thickness in at least one location of the adhesive connection compared with the rest of the adhesive connection. That is, the adhesive can be thicker at one location that at another location. As a result of increased adhesive layer thickness in at least one location of the adhesive connection, there is a greater elasticity, a higher ductility and elongation before rupture at this location. The increased adhesive layer thickness at least at one location of the adhesive connection can be achieved, for example, by a suitable forming of each receptacle.

For example, if the receptacle of the first load-introducing element is formed as a longitudinal groove or as two longitudinal grooves or as three longitudinal grooves and a transverse groove, each groove can be completely filled with adhesive so that the first connection area of the supporting profile, which is inserted into this receptacle, is completely wetted with adhesive. In addition, the first connection area can be covered with adhesive before joining. When joining, the adhesive is partially displaced from the receptacle of the first load-introducing element so that formation of air bubbles can be reduced. It will be appreciated that this can also be carried out for the second load-introducing element and the second connection area. Alternatively, the bonding can be configured in single shear. That is, the receptacle of the first load-introducing element is not completely filled with adhesive; rather, this adhesive is applied selectively to two opposite lateral surfaces of the receptacle which is formed as a groove. The first connection area of the supporting profile is likewise wetted with adhesive only at two lateral surfaces which correspond to the lateral surfaces of the receptacle. The bond in this case is not encircling. It will be appreciated that this can also be carried out for the second load-introducing element and the second connection area.

It is advantageous that the quantity of steps in the production process is appreciably reduced compared to the prior art. Further, the production process is more economical and simpler compared to the prior art. Further, the axle strut is modularizable.

When the axle strut is used in a vehicle and an axial load is introduced into the axle strut via the load-introducing elements, e.g., compressive forces or tensile forces, this load is transmitted to the supporting profile by the load-introducing elements two-dimensionally by thrust. The supporting profile receives this axial load. The axle strut is lighter than conventional metal axle struts because the supporting profile is formed from FRP. The dimensioning of the depicted axle strut can be varied such that it can be used in a commercial vehicle. Alternatively, the dimensioning of the axle strut can be varied in such a way that it can be used in a passenger vehicle. The axle strut can also be utilized in the suggested construction as coupling rod, articulated support or stabilizer rod.

According to an embodiment form, the supporting profile is formed from a core profile and two longitudinal profiles, the longitudinal profiles are connected to the core profile in such a way that a first longitudinal profile completely covers a first lateral surface of the core profile that is parallel to a longitudinal axis of the axle strut, and a second longitudinal profile completely covers a second lateral surface of the core profile that is parallel to the longitudinal axis of the axle strut and parallel to the first lateral surface, and the longitudinal profiles have the connection areas.

In other words, the longitudinal profiles are formed as thin strips of material similar to a rectangular plate. The two longitudinal profiles are preferably identically formed.

Every longitudinal profile has a longitudinal extent that exceeds the thickness of the longitudinal profile. The two longitudinal profiles have a unidirectional fiber reinforcement, and the fibers are oriented in longitudinal direction. The longitudinal direction of every longitudinal profile is the same longitudinal direction as the axle strut. The longitudinal profiles have a high stiffness and strength because of the unidirectional fiber reinforcement.

The core profile is tubular and has an H-shaped, double H-shaped, plus-shaped, or rectangular cross section or other suitable cross section. The core profile can have a low stiffness. The core profile is formed, for example, from an FRP which has a fiber angle appreciably diverging from 0°, for example, 45°, and accordingly has a certain axial softness. The load-bearing capacity of the core profile, and therefore of the entire axle strut, is improved over the prior art by the H-shaped, double H-shaped, or plus-shaped cross section. The available installation space is utilized virtually completely by the core profile. The core profile is prevented from collapsing under the high pressure occurring during the hardening of the axle strut with a supporting winding of FRP, preferably CRP, in a press or autoclave. The core profile is accordingly configured in such a way that it can withstand high external pressures.

The core profile has two lateral surfaces that are parallel to one another and oriented in longitudinal direction of the axle strut. These lateral surfaces are the vertical bars of the H in an H-shaped or double H-shaped cross section, the perpendicular sides for a rectangular cross section, and the side faces of the horizontal bar in a plus-shaped cross section. The first lateral surface of the core profile is completely covered by the first longitudinal profile, which is connected to this first lateral surface. The first longitudinal profile can preferably have a greater longitudinal extent than the core profile so that the first longitudinal profile protrudes in longitudinal direction over the first lateral surface of the core profile on both sides. The second lateral surface of the core profile is completely covered by the second longitudinal profile, which is connected to this second lateral surface. The second longitudinal profile can preferably have a greater longitudinal extent than the core profile so that the second longitudinal profile protrudes in longitudinal direction over the second lateral surface of the core profile on both sides.

The portion of the first longitudinal profile that protrudes over the first lateral surface on the first load-introducing element side and the portion of the second longitudinal profile that protrudes over the second lateral surface on the first load-introducing element side form the first connection area of the supporting profile. The portion of the first longitudinal profile that protrudes over the first lateral surface on the second load-introducing element side and the portion of the second longitudinal profile that protrudes over the second lateral surface on the second load-introducing element side form the second connection area of the supporting profile.

Alternatively, the longitudinal extent of the core profile can be the same as the longitudinal extent of the two longitudinal profiles, and the first connection area of the supporting profile forms the end of the supporting profile that faces the first load-introducing element, and the second connection area of the supporting profile forms the end of the supporting profile which faces the second load-introducing element. In vertical direction, the first longitudinal profile and the second longitudinal profile and the core profile preferably extend to the same height. The vertical direction is perpendicular to the longitudinal direction.

A modularized production is made possible in a simple and inexpensive manner by forming the supporting profile from two longitudinal profiles and a core profile.

According to a further embodiment form, the longitudinal profiles are glued to the core profile. The two longitudinal profiles are preferably formed from the same FRP, e.g., CRP. The core can be formed from an FRP that differs from the FRP of the two longitudinal profiles or from the same FRP as the two longitudinal profiles, e.g., CRP or GRP. The core profile has a surface treatment at its lateral surfaces that facilitates bonding, e.g., the lateral surface can be roughened in its entirety or in a partial area. Additionally or alternatively, the surfaces of the two longitudinal profiles glued to the core profile can have a surface treatment that facilitates bonding, e.g., the surfaces can be roughened in their entirety or only in a partial area. Every lateral surface has an extension in vertical direction and longitudinal direction but not in transverse direction.

According to a further embodiment form, the supporting profile, which has the longitudinal profiles and the core profile, is formed in one piece. The core profile and the longitudinal profiles are formed from the same FRP, e.g., CRP or GRP. This one-piece, hence integral, construction of the supporting profile simplifies the production process and is inexpensive.

According to a further embodiment form, the supporting profile has at least one guide offset at each of its connection areas. This guide offset is a material thickening in longitudinal direction of the axle strut and is arranged, for example, at the longitudinal profile. For example, the first longitudinal profile can have a guide offset at that lateral surface which faces away from the core profile. Alternatively or additionally, for example, the first longitudinal profile can have a guide offset at the lateral surface facing the core profile. Alternatively or additionally, the second longitudinal profile can have a guide offset at the lateral surface which faces away from the core profile. Alternatively or additionally, the second longitudinal profile can have a guide offset at the lateral surface facing the core profile.

It will be appreciated that the supporting profile can have more than one guide offset at each of its connection areas. The at least one guide offset is preferably formed identically at every connection area of the supporting profile but, alternatively, they can also differ from one another.

The at least one guide offset serves to locate every connection area accurately during production of the adhesive connection to the respective load-introducing element. When using the axle strut in a vehicle, it is advantageous to define the dimensioning of the adhesive connection for transmitting the forces that are introduced into the axle strut by the load-introducing elements. This is facilitated by the at least one guide offset. Therefore, every connection area preferably has one guide offset for every adhesive connection.

According to a further embodiment form, every adhesive connection is configured such that it has at least two different adhesive layer thicknesses along its length. For example, the adhesive layer thickness at the edge areas of the load-introducing elements that face the supporting profile can be increased compared with the adhesive layer thickness along the further length of the adhesive connection.

An increased adhesive layer thickness can be achieved, for example, in that the receptacle of every load-introducing element has a recess or notch so that an increased adhesive layer thickness is formed at this recess or notch.

This is advantageous in that stress peaks between the supporting profile and the load-introducing elements are reduced by the increased adhesive layer thickness in predetermined areas of the adhesive connection, since a higher elasticity, ductility and elongation before rupture is provided by an increased adhesive layer thickness. The transmission of force to a larger connection area is made possible in this way.

According to a further embodiment form, the core profile is formed from a GRP or a CRP. The core profile preferably has a low stiffness, e.g., approximately 14 GPa.

According to a further embodiment form, the longitudinal profiles are formed from a GRP or a CRP. The longitudinal profiles preferably have a high stiffness, which is appreciably higher than that of the core profile. The fiber reinforcement of the two longitudinal profiles is preferably unidirectional.

According to a further embodiment form, the load-introducing elements are formed from aluminum or from an FRP. If the load-introducing elements are formed from an FRP, they are formed as molded articles of FRP, e.g., SMCs (carbon fiber reinforced or glass fiber reinforced). Forming the load-introducing elements from FRP is advantageous in that they have a reduced mass compared with forming from a metal material.

According to a further embodiment form, every adhesive connection is formed by means of an elastic adhesive. This elastic adhesive has a high elongation before rupture compared to inelastic adhesives. When the axle strut is used in a vehicle, local stress peaks are reduced by utilizing the elastic adhesive.

According to a further embodiment form, the first connection area of the supporting profile has a front gap relative to the first load-introducing element, and the second connection area of the supporting profile has a further front gap relative to the second load-introducing element. The supporting profile has a first end face and a second end face. The first end face is oriented in direction of the first load-introducing element. The second end face is oriented in direction of the second load-introducing element. The first end face and second end face are perpendicular to the longitudinal axis of the axle strut.

This means that the first connection area of the supporting profile is connected to the first load-introducing element such that only the lateral surface regions of the supporting profile that are formed by the two longitudinal profiles contact the first load-introducing and are connected to the latter by the adhesive connection. There is no adhesive connection to the first load-introducing element at the end face of the first connection area of the supporting profile. In other words, there is a hollow space or area free of material which is not filled with adhesive.

Further, the second connection area of the supporting profile is connected to the second load-introducing element such that only the lateral surface regions of the supporting profile that are formed by the two longitudinal profiles contact the second load-introducing element and are connected to the latter by the adhesive connection. There is no adhesive connection to the second load-introducing element at the end face of the second connection area. In other words, there is a hollow space or area which is not filled with adhesive.

As result of this front gap of the supporting profile relative to the two load-introducing elements, it is ensured when the axle strut is used in a vehicle that a transmission of force at the supporting profile takes place only through shear stress when load is introduced into the axle strut via the load-introducing elements. Further, damage to the front of the supporting profile due to load input is prevented.

In a method for producing an axle strut which has been described in the foregoing, the core profile is first cleaned. Subsequently, the first longitudinal profile is glued to the first lateral surface of the core profile and, simultaneously or within a short time interval, the second longitudinal profile is glued to the second lateral surface of the core profile to form the supporting profile. Subsequently, the two load-introducing elements are cleaned. The receptacle of the first load-introducing element is thereupon filled with adhesive for preparing the adhesive connection, and the receptacle of the second load-introducing element is filled with adhesive to prepare the further adhesive connection. The first connection area is wetted with adhesive. The second connection area is likewise wetted with adhesive. The first connection area of the supporting profile is received by the receptacle of the first load-introducing element, and the second connection area of the supporting profile is received by the receptacle of the second load-introducing element, and the supporting profile is aligned. Lastly, the adhesive connections are cured.

The longitudinal profiles are preferably produced and cured separately. The longitudinal profiles are produced through a pultrusion process, for example. The load-introducing elements are preferably produced through an extrusion process if they are formed of aluminum or FRP.

The longitudinal profiles and the load-introducing elements are produced in a simple and inexpensive manner in that the longitudinal profiles are produced through a pultrusion process and the load-introducing elements are produced through an extrusion process. In addition, it is ensured that the axle strut is modularizable in a simple manner.

BRIEF DESCRIPTION OF THE DRAWINGS

Various embodiment examples and details of the invention will be described more fully with reference to the figures described in the following. The drawings show.

DETAILED DESCRIPTION OF THE PRESENTLY PREFERRED EMBODIMENTS

Figure 1:
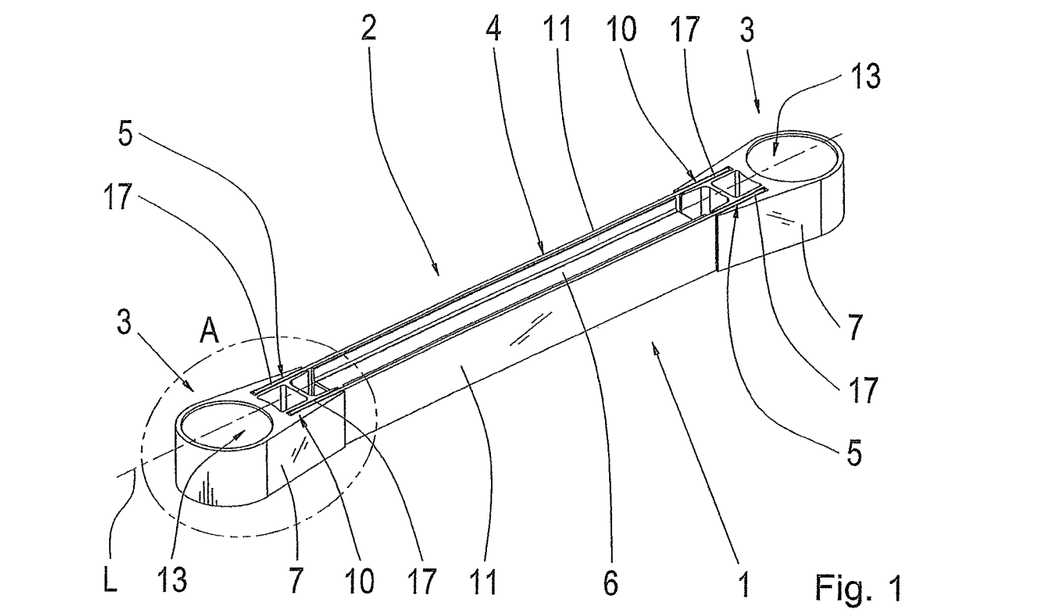
FIG. 1 is a schematic diagram of an axle strut.

FIG. 1 shows a schematic diagram of an axle strut 1 according to an embodiment example. Axle strut 1 has two bearing regions 3 and a shaft 2. The axle strut extends from a first bearing region 3 along shaft 2 to a second bearing region 3. Axle strut 1 is formed from a supporting profile 4 and two load-introducing elements 7. Supporting profile 4 is in turn formed from two longitudinal profiles 11 and a core profile 6. Axle strut 1 further has a longitudinal axis L. Axle strut 1 is symmetrical to this longitudinal axis L.

Supporting profile 4 has core profile 6, which is preferably formed from a GRP. Further, supporting profile 4 has two longitudinal profiles 11, which are preferably formed from a CRP. Core profile 6 is tubular and preferably has an H-shaped or a double H-shaped cross section. Further, core profile 6 is planar. The two longitudinal profiles 11 are formed identical to one another. Every longitudinal profile 11 is plate-shaped and planar. The two longitudinal profiles 11 have a longer longitudinal extent than core profile 6. The two longitudinal profiles 11 have a unidirectional fiber reinforcement with orientation in longitudinal direction of axle strut 1. The longitudinal direction of axle strut 1 is determined by longitudinal axis L.

A first longitudinal profile 11 is connected to a lateral surface of core profile 6. A second longitudinal profile 11 is connected to a further lateral surface of core profile 6. This connection is such that the first lateral surface of core profile 6 is completely covered by the first longitudinal profile 11. The second lateral surface of core profile 6 is completely covered by second longitudinal profile 11. That is, first longitudinal profile 11 contacts the entire first lateral surface of core profile 6, and the second longitudinal profile 11 contacts the entire second lateral surface of core profile 6. The two lateral surfaces of core profile 6 are the two vertical bars of the H or double H in the cross section of core profile 6.

The two longitudinal profiles 11 are formed such that they project over the length of core profile 6 at the end of core profile 6 facing first load-introducing element 7 and at the end of core profile 6 facing the second load-introducing element 7. These areas of the two longitudinal profiles 11 that protrude beyond core profile 6 form a first connection area 5 of supporting profile 4 and a second connection area 5 of supporting profile 4. First connection area 5 of supporting profile 4 is oriented in direction of first load-introducing element 7. Second connection area 5 of supporting profile 4 is oriented in direction of second load-introducing element 7.

The two load-introducing elements 7 have, in each instance, a cutout 13 for receiving a bearing, for example, a rubber-metal bearing. These cutouts 13 are cylindrically shaped. Further, every load-introducing element 7 has a receptacle 10, which is suitable to receive the respective connection area 5 of supporting profile 4. Receptacle 10 of each load-introducing element 7 is in the form of two longitudinal grooves 17. Every groove 17 is formed in such a way that is suitable to receive the portion of the respective longitudinal profile 11 that forms the respective connection area 5. Every longitudinal groove 17 is formed such that it has sufficient space for an adhesive so that an adhesive connection can be produced between the first load-introducing element 7 and supporting profile 4 and between second load-introducing element 7 and supporting profile 4.

During a manufacturing process for producing axle strut 1, every longitudinal groove 17 that forms receptacles 10 is filled with a liquid elastic adhesive. In addition, the portion of first longitudinal profile 11 and the portion of second longitudinal profile 11 that form the first connection area 5 and the portion of first longitudinal profile 11 and the portion of second longitudinal profile 11 that form the second connection area 5 are wetted or smeared with adhesive to a predefined layer thickness. Subsequently, first connection area 5 is inserted into receptacle 10 of first load-introducing element 7. Second connection area 5 is likewise inserted into receptacle 10 of second load-introducing element. Subsequently, the connections formed in this way are cured. Owing to the fact that the grooves 17 have been completely filled with adhesive, possible formation of air bubbles, which can lead to damage is suppressed or reduced through a displacement process when supporting profile 4 is inserted into receptacle 10.

Figure 5:
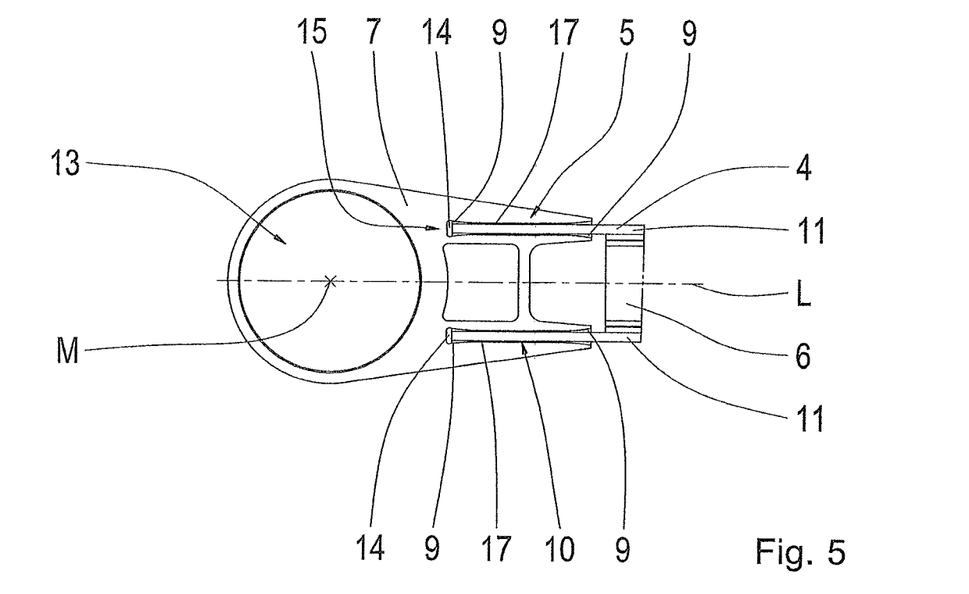
FIG. 5 is an enlarged schematic diagram of the load-introducing element from FIG. 1 (enlargement area A)

Further, FIG. 1 shows an enlargement area A which is shown in more detail in FIG. 5.

Figure 2:
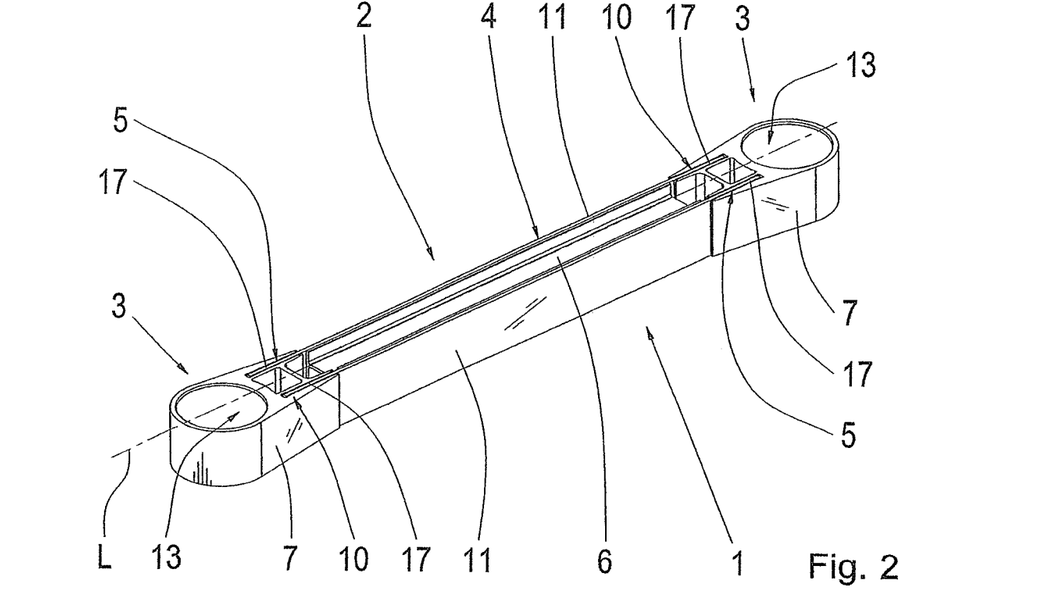
FIG. 2 is a schematic diagram of an axle strut.

FIG. 2 shows a schematic view of an axle strut 1 according to a further embodiment example. As with the axle strut in FIG. 1, this axle strut 1 has two bearing regions 3 and a shaft 2. As was already shown in FIG. 1, every load-introducing element 7 has a receptacle 10 formed by two longitudinal grooves 17. The two load-introducing elements 7, which are shown here in FIG. 2, are also formed like load-introducing elements 7 depicted in FIG. 1. The connection between the two load-introducing elements 7 and supporting profile 4 is also described exactly as in FIG. 1.

Supporting profile 4 has a core profile 6 and two longitudinal profiles 11. Longitudinal profiles 11 and core profile 6 have the same geometric shape as shown in FIG. 1. However, the two longitudinal profiles 11 and core profile 6 are formed from the same FRP, namely CRP. Longitudinal profiles 11 and core profile 6 are produced in one piece in a single process step. The two longitudinal profiles 11 have a unidirectional fiber reinforcement with orientation in longitudinal direction of axle strut 1. The longitudinal direction of axle strut 1 is determined by longitudinal axis L.

Figure 3:
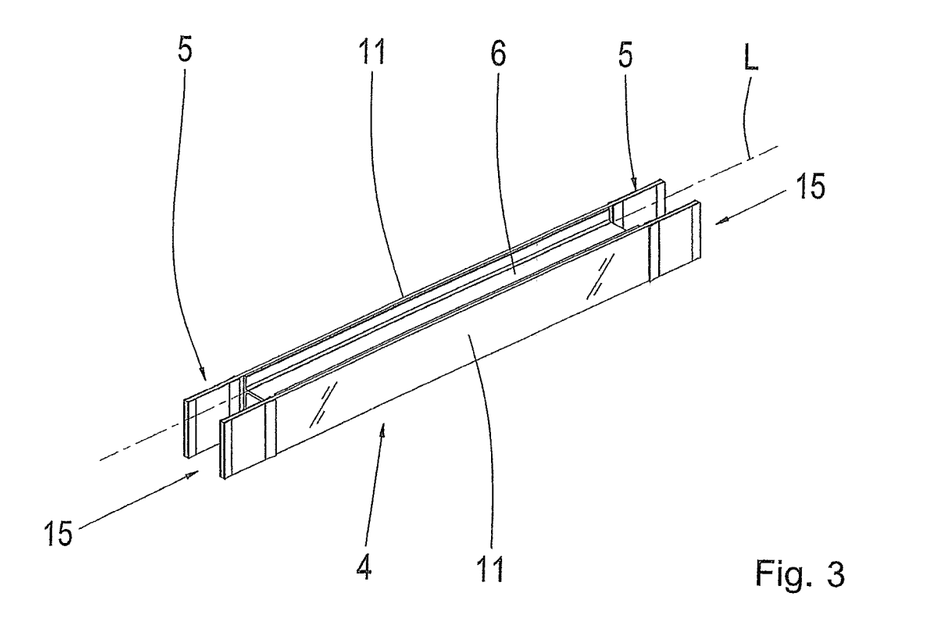
FIG. 3 is a schematic diagram of the supporting profile of the axle strut from FIG. 2.

FIG. 3 shows a schematic view of supporting profile 4 of axle strut 1 from FIG. 2. In this case, it can clearly be discerned that supporting profile 4 is formed in one piece, i.e., both the core profile 6 and the two longitudinal profiles 11 were produced in a single process step to form supporting profile 4. Core profile 6 and the two longitudinal profiles 11 accordingly form a single component. Further, a first end face 15 and a second end face 15 of supporting profile 4 are shown. Every supporting profile 4 has a first end face 15 and a second end face 15 irrespective of the construction of the supporting profile 4 per se.

Figure 4:
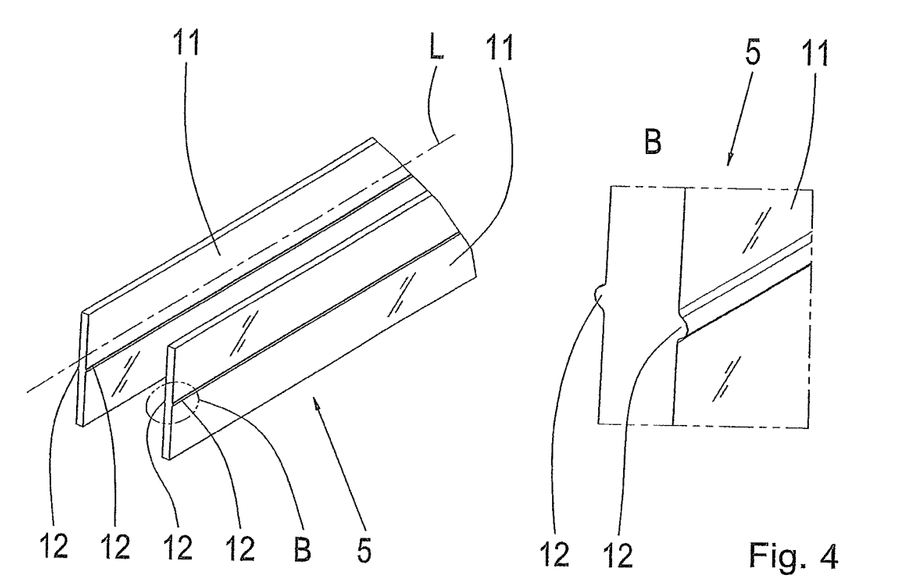
FIG. 4 is a schematic diagram of a first connection area of a supporting profile of an axle strut and an enlarged detail of the connection area.

FIG. 4 shows a schematic view of a first connection area 5 of a supporting profile 4 of axle strut 1 and an enlarged detail of connection area 5 according to an embodiment example. In view of the enlarged depiction, only the first connection area 5 formed by the two longitudinal profiles 11 is shown. Every longitudinal profile 11 has two guide offsets 12. Guide offsets 12 extend along the longitudinal direction of the axle strut. This longitudinal direction is determined by longitudinal axis L. Every guide offset 12 is a projection at the respective lateral surfaces of longitudinal profiles 11. Guide offsets 12 allow supporting profile 4 to be exactly positioned inside the receptacles 10 formed by grooves during production of axle strut 1. This is advantageous because an adhesive gap having predefined dimensions is necessary for the transmission of forces during a load event when the axle strut 1 is used in a vehicle.

FIG. 5 shows an enlarged schematic view of load-introducing elements 7 from FIG. 1 in enlargement area A. It will be clearly discerned that receptacle 10 of load-introducing element 4 is formed by two longitudinal grooves 17. Every groove 17 is formed in such a way that there is room for an adhesive layer 9 on both sides of the respective longitudinal profile portions 11 in groove 17 in addition to the portion of first longitudinal profile 11 and the portion of second longitudinal profile 11 that form connection area 5. Adhesive connections 9 are configured such that the thickness of the adhesive layer varies along the longitudinal extent of the adhesive connection 9. In this case, the adhesive layer thickness is directly increased at the entry area of receptacles 10. Further, the adhesive layer thickness is increased at the respective groove ends. This is achieved in that the longitudinal grooves 17 at these locations have a recess in each instance such that a thicker adhesive layer thickness can be achieved. Increasing the adhesive layer thickness is advantageous in that it prevents stress peaks between supporting profile 4 and load-introducing elements 7.

It will further be clearly discerned that there is a gap between supporting profile 4 and load-introducing element 7 at the end face 15 of supporting profile 4. A gap 14 is present in every groove 17. This gap 14 is completely free from adhesive or other material. Because of this gap 14 on the front side, a transmission of force between load-introducing element 7 and supporting profile 4 takes place only by shear stress during a load event of axle strut 1 when axle strut 1 is used in a vehicle.

Figure 6:
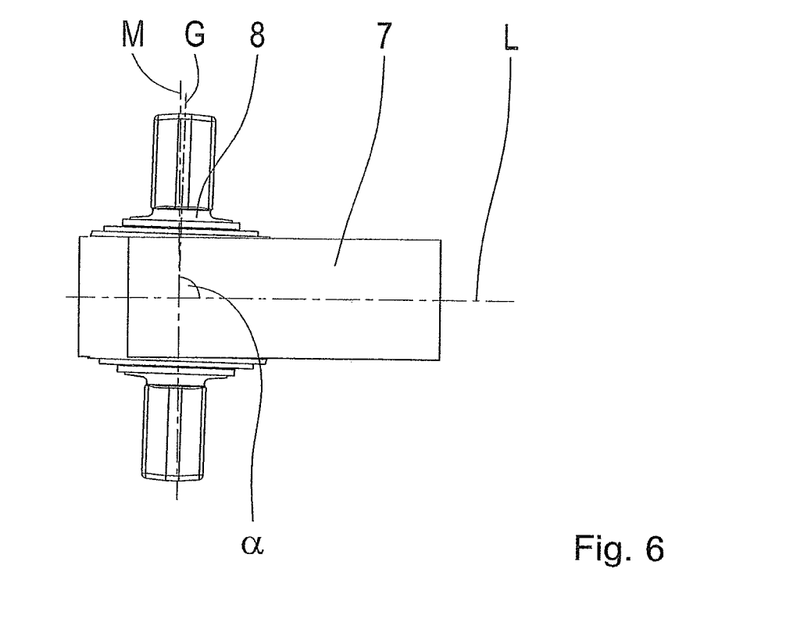
FIG. 6 is a schematic diagram of a detail from an axle strut with a bearing.

FIG. 6 shows a schematic view of a detail from an axle strut 1 with a bearing 8 according to an embodiment example. Only one load-introducing element 7, to which bearing 8 is connected, is shown. Bearing 8 is an elastomeric bearing. It is shown here that bearing 8 moves such that the central axis M of cutout 13 of load-introducing element 7 is not coaxial with the bearing axis G so that an angle α is formed between bearing axis G and longitudinal axis L. Accordingly, bearing axis G is not perpendicular to longitudinal axis L. Central axis M, however, is perpendicular to longitudinal axis L.

Figure 7:
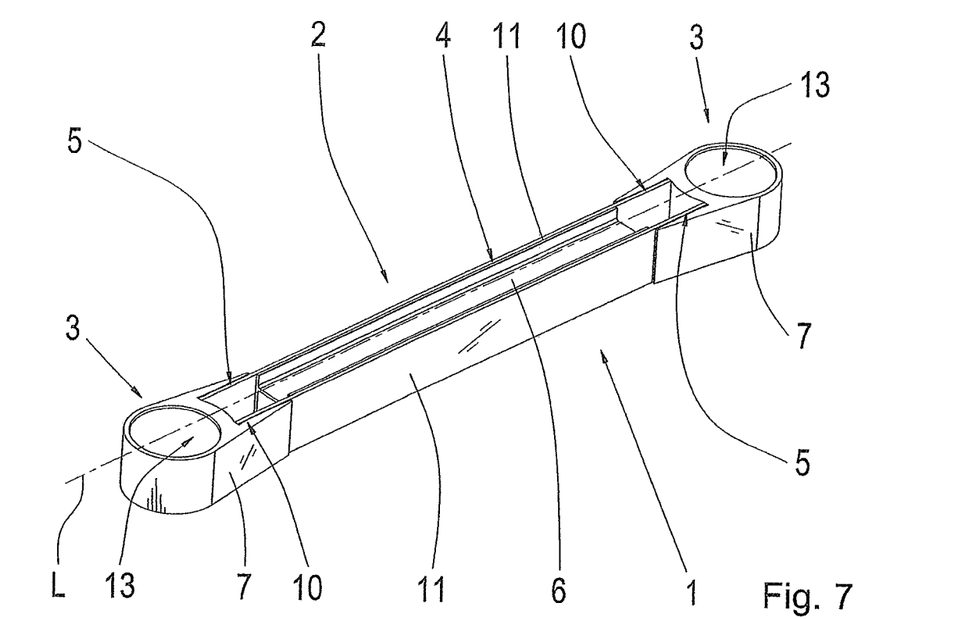
FIG. 7 is a schematic diagram of an axle strut.

FIG. 7 shows a schematic view of an axle strut 1 according to a further embodiment example. Axle strut 1 has two bearing regions 3 and a shaft 2. Axle strut 1 is formed from two load-introducing elements 7 and a supporting profile 4. Supporting profile 4 is formed from two longitudinal profiles 11 and a core profile 6.

Supporting profile 4 is likewise formed in the same way as described in FIG. 1. However, the two load-introducing elements 7 are formed differently compared to FIGS. 1 to 6. Receptacle 10 of first load-introducing element 7 is formed as a wide longitudinal groove 17. Receptacle 10 of second load-introducing element 7 is likewise formed as a wide longitudinal groove 17. These two longitudinal grooves 17 are just as wide as supporting profile 4. The width is oriented in the direction perpendicular to the longitudinal direction determined by longitudinal axis L and perpendicular to a vertical direction determined by central axis M of cutouts 13. Receptacle 10 of first load-introducing element 7 is accordingly formed such that first connection area 5 of supporting profile 4 can be inserted in its entirety into this groove. In exactly the same way, receptacle 10 of second load-introducing element 7 is formed such that the entire second connection area 5 of supporting profile 4 can be received by this receptacle 10.

During the production of axle strut 10, the longitudinal groove 17 is not completely filled with adhesive compared to FIGS. 1 to 6. Rather, the adhesive connection is only single-sheared, i.e., the area of first longitudinal profile 11 forms first connection area 5 that is wetted with adhesive on only one side, namely, on that side contacting load-introducing element 7. The area of second longitudinal profile 11 forming first connection area 5 is likewise wetted with adhesive only on one side that contacts first load-introducing element 7. The same is true for second load-introducing element 7. This single-shear arrangement of the adhesive connection is particularly advantageous for axle struts 1 that are lightly loaded.

Figure 8:
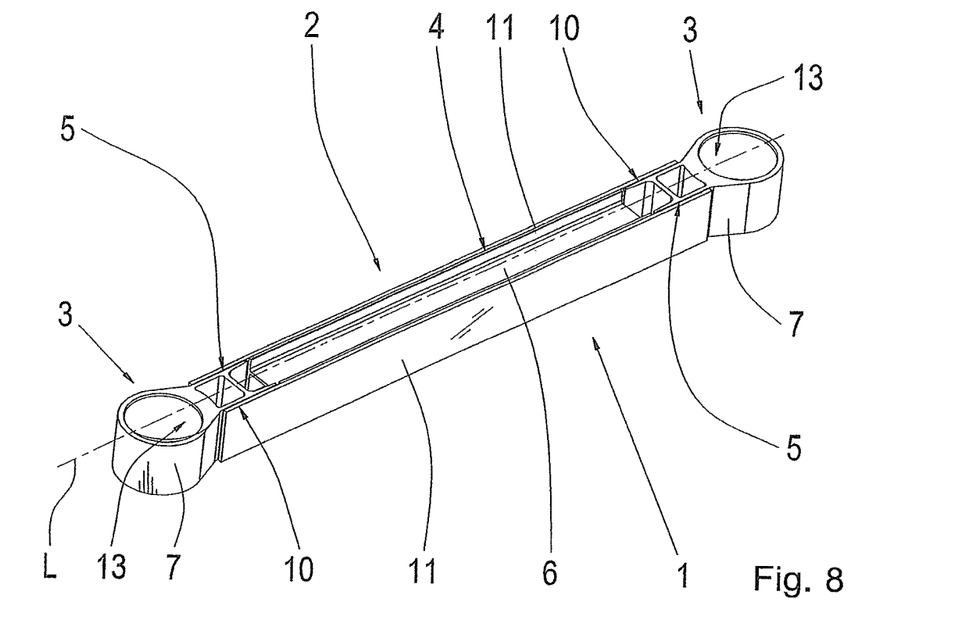
FIG. 8 is a schematic diagram of an axle strut.

FIG. 8 shows a schematic view of an axle strut 1 according to a further embodiment example. This axle strut 1 has a shaft 2 and two bearing regions 3. Axle strut 1 is formed from a supporting profile 4 and two load-introducing elements 7. Supporting profile 4 is likewise formed as described referring to FIG. 1.

In contrast, the two load-introducing elements 7 are formed differently than in FIGS. 1 to 7. Every load-introducing element 7 has a receptacle 10 for the respective connection areas 5 of supporting profile 4. Receptacle 10 of first load-introducing element 7 is formed as a joint region of an outer lateral surface of first load-introducing element 7. Receptacle 10 of second load-introducing element 7 is formed as a joint region of the outer lateral surface of the second load-introducing element. A joint region is a surface area of load-introducing element 7 that is contacted by the respective connection area 5 of supporting profile 4. This joint region that forms receptacle 10 of first load-introducing element 7, and the joint region that forms receptacle 10 of second load-introducing element 7 can preferably have a surface treatment that promotes an adhesive connection between supporting profile 4 and the two load-introducing elements 7.

First connection area 5 of supporting profile 4 is glued to the first load-introducing element 7 at receptacle 10 thereof. Second connection area 5 is glued to the receptacle 10 of the second load-introducing element 7. Accordingly, a single-shear adhesive connection is provided. The first longitudinal profile 11 is accordingly glued to the first load-introducing element 7 and second load-introducing element 7 from the outside. Second longitudinal profile 11 is likewise glued to first load-introducing element 7 and second load-introducing element 7 from the outside. The axle strut 1 shown in FIG. 8 is therefore particularly suitable for light loads.

Figure 9:
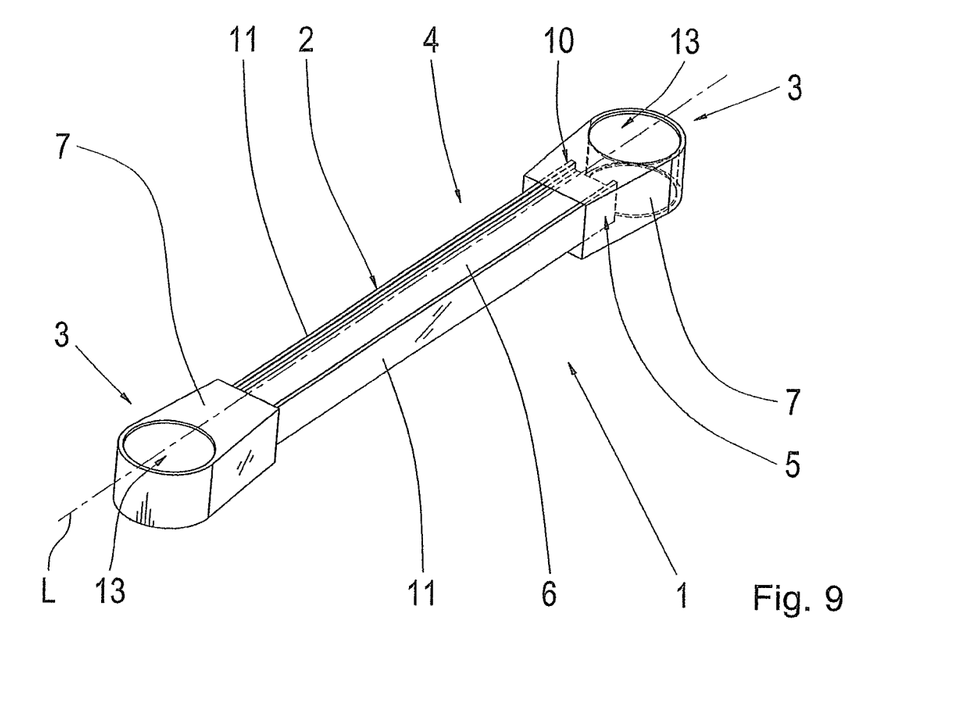
FIG. 9 is a schematic diagram of an axle strut.

FIG. 9 shows a schematic view of an axle strut 1 according to an embodiment example. Axle strut 1 has two bearing region 3 and a shaft 2. Axle strut 1 is formed from two load-introducing elements 7 and a supporting profile 4. Supporting profile 4 forms the shaft of axle strut 1, the two load-introducing elements 7 form the two bearing regions 3 of axle strut 1. Axle strut 1 has a longitudinal axis L.

Supporting profile 4 is formed from a core profile 6 and two longitudinal profiles 11. Core profile 6 is formed in the same manner already described referring to FIG. 2. Longitudinal profiles 11 are formed similarly as in FIG. 1 and FIG. 2. However, longitudinal profiles 11 have the same longitudinal extent as core profile 6. Accordingly, the two longitudinal profiles 11 and core profile 6 have the same length. Longitudinal profiles 11 and core profile 6 are formed from CRP. Further, supporting profile 4 is formed in one piece with the two longitudinal profiles 11 and core profile 6.

The two load-introducing elements 7 have in each instance a cutout 13 for a bearing. This cutout 13 is cylindrically shaped. Every load-introducing element 7 has a receptacle 10 for the respective connection area 5 of supporting profile 4. Receptacle 10 of each load-introducing element 7 is formed as a clearance. This clearance is configured such that is suitable to receive the respective connection area 5 of supporting profile 4 in its entirety. The first connection area of supporting profile 4 is accordingly inserted into the clearance which forms receptacle 10 of first load-introducing element 7. The second connection area 5 is likewise inserted into the clearance which forms receptacle 10 of second load-introducing element 7. The two load-introducing elements 7 are arranged in the same horizontal plane. Accordingly, axle strut 1 is formed to be planar. Supporting profile 4 is preferably tubular. Supporting profile 4 has a rectangular cross section.

In the production process, every receptacle 10 is completely filled with adhesive so that an adhesive connection is produced between supporting profile 4 and first load-introducing element 7 and second load-introducing element 7 when supporting profile 4 is inserted into the respective receptacles 10. This has the advantage that the axle strut 1 can be modularized in a simple manner.

Figures 10, 11A, 11B:
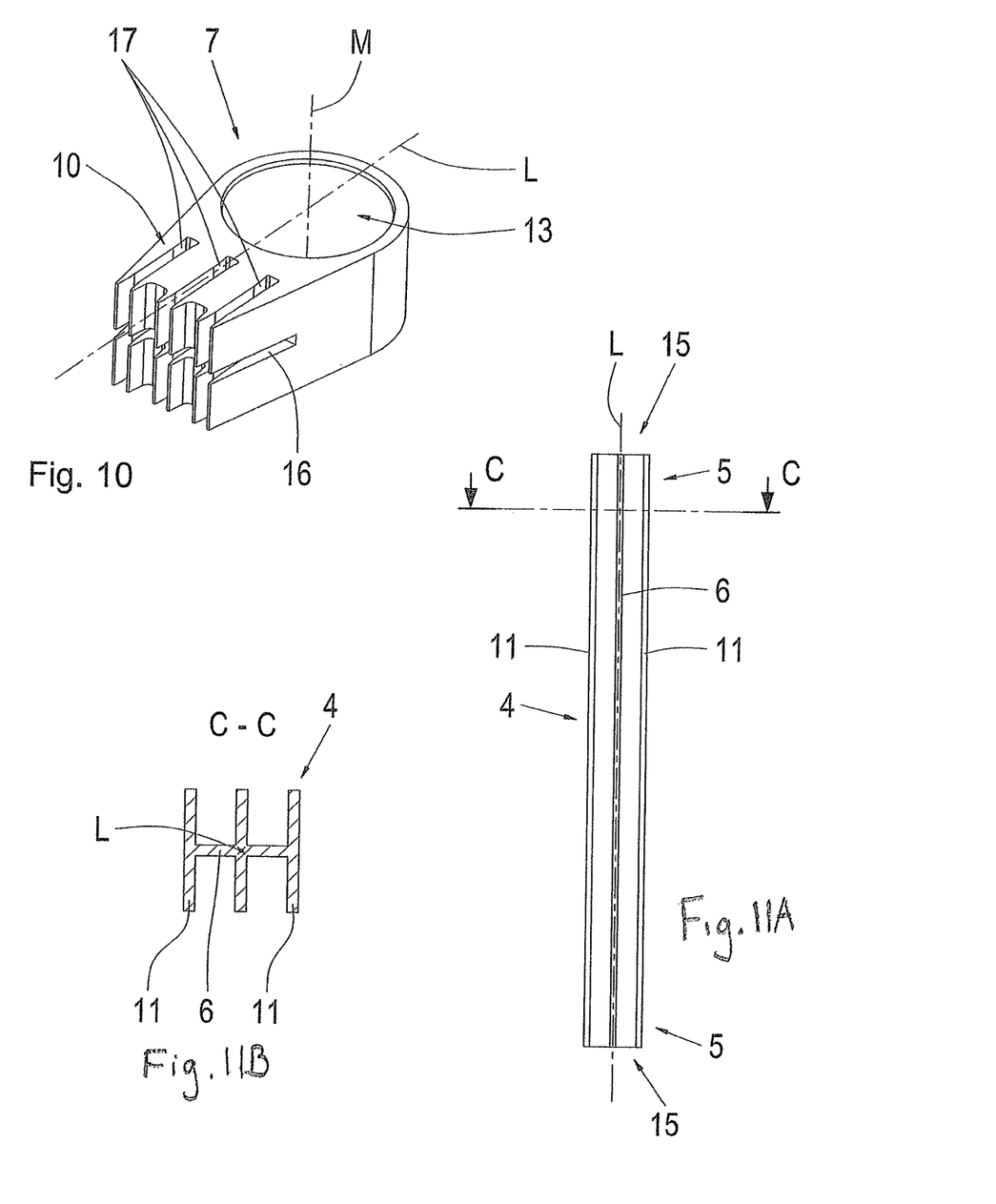
FIG. 10 is a schematic diagram of a load-introducing element.
FIGS. 11A and 11B are schematic top and sectional views of a supporting profile in two view.

FIG. 10 shows a schematic view of load-introducing element 7 according to a further embodiment example. Load-introducing element 7 has a cutout 13 for receiving a bearing, for example, a rubber-metal bearing. This cutout 13 is cylindrically shaped. Load-introducing element 7 is preferably formed from a metal material, e.g., aluminum, by an extrusion process. Alternatively, load-introducing element 7 can be formed from an FRP by f an extrusion process.

Further, load-introducing element 7 has a receptacle 10 configured to receive the respective connection area 5 of supporting profile 4. Receptacle 10 of load-introducing element 7 is formed as three longitudinal grooves 17 and a transverse groove 16. The three longitudinal grooves 17 are parallel to one another and to longitudinal axis L. The transverse groove is perpendicular to longitudinal axis L and to the three longitudinal grooves. Longitudinal grooves 17 are equidistant from one another. Transverse groove 16 has the same distance from each top surface of load-introducing element 7. Transverse groove 16 has the same longitudinal extent as the three longitudinal grooves 17. Load-introducing element 7 is formed in such a way that a stress profile in load-introducing element 7 is as optimal as possible when a load event occurs.

Each longitudinal groove 17 and the transverse groove 16 are configured such that they are suitable to receive the portion of supporting profile 4 that forms the respective connection area 5. Every longitudinal groove 17 and the transverse groove 16 are formed in such a way that they have sufficient room for an adhesive so that an adhesive connection can be produced between load-introducing element 7 and supporting profile 4.

During a manufacturing process for producing axle strut 1, two of the load-introducing elements 7 shown here are required. Transverse groove 16 and each longitudinal groove 17 that form receptacles 10 are filled with a liquid elastic adhesive. In addition, the portion of supporting profile 4 forming first connection area 5 and the portion of supporting profile 4 forming second connection area 5 are wetted or smeared with adhesive to a predefined layer thickness. Subsequently, first connection area 5 is inserted into receptacle 10 of a first load-introducing element 7. Second connection area 5 is likewise inserted into receptacle 10 of a second load-introducing element. Subsequently, the connections formed in this way are cured. Owing to the fact that grooves 16, 17 have been completely filled with adhesive, possible formation of air bubbles that can lead to damage is suppressed or reduced through a displacement process when supporting profile 4 is inserted into receptacles 10.

FIGS. 11A and 11B shows two schematic views of a supporting profile 4 according to a further embodiment example. A top view of supporting profile 4 is shown in FIG. 11A and a sectional view of supporting profile 4 along section line C-C is shown in FIG. 11B. Supporting profile 4 has a core profile 6 and two longitudinal profiles 11. Core profile 6 has a plus-shaped cross section. The two longitudinal profiles 11 have a rectangular cross section. The two longitudinal profiles 11 are formed identical to one another.

Core profile 6 and the two longitudinal profiles 11 are made from the same material, e.g., GRP or CRP. Supporting profile 4 is formed in one piece. Core profile 6 and the two longitudinal profiles 11 are accordingly formed in the same process step. The two longitudinal profiles 11 and core profile 6 have the same extent in vertical direction. The vertical direction is perpendicular to the longitudinal direction which is determined by longitudinal axis L and perpendicular to a transverse direction corresponding to section line C-C. Longitudinal profiles 11 and core profile 6 extend by the same length in longitudinal direction.

It will be clearly discerned from the top view that supporting profile 4 has a first end face 15 and a second end face 15. Further, supporting profile 4 has a first connection area 5 and a second connection area 5 configured to be connected to load-introducing elements 7. When supporting profile 4 is connected to the two load-introducing elements 7 shown in FIG. 10, the two longitudinal profiles 11 are inserted into the outer longitudinal grooves 17 of load-introducing elements 7. Core profile 6 is inserted into the center longitudinal groove 17 and into transverse groove 16 of load-introducing elements 7. The two load-introducing elements 7 are glued to supporting profile 4 an adhesive connection, which has already been described referring to FIG. 10.

The examples shown herein were selected to be exemplary. The dimensioning of the axle strut shown herein can be varied such that it can be utilized in a commercial vehicle. Alternatively, the dimensioning of the axle strut can be varied such that it can be utilized in a passenger vehicle. The axle strut constructed in the suggested manner can be used as coupling rod, articulated support or stabilizer rod.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An axle strut for a vehicle, comprising:
   a shaft;
   two bearing regions;
   a supporting profile arranged at the shaft spatially between the two bearing regions; and
   a first load-introducing element is arranged at a first bearing region of the two bearing regions, a second load-introducing element is arranged at a second bearing region of the two bearing regions,
   wherein the supporting profile is formed from fiber reinforced plastics composite material and comprises:
      at least three longitudinal profiles,
      a first longitudinal profile completely covers a first lateral surface of a core profile that is parallel to a longitudinal axis of the axle strut,
      a second longitudinal profile completely covers a second lateral surface of the core profile that is parallel to the longitudinal axis of the axle strut and parallel to the first lateral surface, and a third longitudinal profile that is part of the core profile and is parallel to the longitudinal axis of the axle strut and arranged between the first longitudinal profile and the second longitudinal profile, wherein the longitudinal profiles have connection areas, wherein the supporting profile has a first connection area facing the first bearing region and a second connection area facing the second bearing region, wherein each load-introducing element has a receptacle, comprising at least three longitudinally extending grooves that are parallel to each other, each longitudinally extending groove configured to mate with a respective longitudinal profile, wherein the supporting profile is connected by its first connection area and by the receptacle of the first load-introducing element to the first load-introducing element by an adhesive connection, and wherein the supporting profile is connected by its second connection area and by the receptacle of the second load-introducing element to the second load-introducing element by a further adhesive connection.

2. The axle strut according to claim 1, wherein the longitudinal profiles are connected to the core profile.

3. The axle strut according to claim 2, wherein at least one of the longitudinal profiles are glued to the core profile.

4. The axle strut according to claim 2, wherein the supporting profile that has the longitudinal profiles and the core profile is formed in one piece.

5. The axle strut according to claim 2, wherein the core profile is formed from one of a glass fiber reinforced plastics composite material and a carbon fiber reinforced plastics composite material.

6. The axle strut according to claim 2, wherein the longitudinal profiles are formed from one of a glass fiber reinforced plastics composite material and a carbon fiber reinforced plastics composite material.

7. The axle strut according to claim 1, wherein the supporting profile has at least one guide offset at each of its connection areas.

8. The axle strut according to claim 1, wherein each respective adhesive connection is configured such that it has at least two different adhesive layer thicknesses along its length.

9. The axle strut according to claim 1, wherein the load-introducing elements are formed from one of aluminum and a fiber reinforced plastics composite material.

10. The axle strut according to claim 1, wherein every adhesive connection is formed by an elastic adhesive.

11. The axle strut according to claim 1, wherein the first connection area of the supporting profile has a front gap relative to the first load-introducing element, and the second connection area of the supporting profile has a further front gap relative to the second load-introducing element.

12. The axle strut according to claim 1, wherein the wherein the supporting profile further comprises a transverse groove that is perpendicular to the longitudinal grooves.

13. The axle strut according to claim 12, wherein the transverse groove and the longitudinal grooves have a same longitudinal extent.

14. A method for producing an axle strut, comprising:
cleaning a core profile having a plus-shaped cross section;
gluing a first longitudinal profile to a first lateral surface of the core profile;
gluing a second longitudinal profile to a second lateral surface of the core profile to form a supporting profile;
cleaning two load-introducing elements, each having at least three longitudinal grooves and one transverse groove;
filling a receptacle of a first load-introducing element with adhesive for preparing an adhesive connection,
filing a receptacle of a second load-introducing element with adhesive to prepare a further adhesive connection;
wetting respective connection areas of the supporting profile with adhesive;
receiving by the receptacle of the first load-introducing element a first connection area of the supporting profile;
receiving by the receptacle of the second load-introducing element a second connection area of the supporting profile;
aligning the supporting profile; and
curing the adhesive connections.

15. The method for producing an axle strut according to claim 14, wherein the longitudinal profiles are produced through a pultrusion process.

16. The method for producing an axle strut according to claim 14 wherein the load-introducing elements are produced through an extrusion process.

* * * * *